United States Patent
Ogi et al.

(10) Patent No.: US 9,961,313 B2
(45) Date of Patent: May 1, 2018

(54) LASER PROJECTION DISPLAY DEVICE

(71) Applicant: Hitachi-LG Data Storage, Inc., Tokyo (JP)

(72) Inventors: Yuya Ogi, Tokyo (JP); Yoshiho Seo, Tokyo (JP)

(73) Assignee: Hitachi-LG Data Storage, Inc., Tokyo (JP)

(*) Notice: Subject to any disclaimer, the term of this patent is extended or adjusted under 35 U.S.C. 154(b) by 0 days. days.

(21) Appl. No.: 15/465,809

(22) Filed: Mar. 22, 2017

(65) Prior Publication Data

US 2017/0280117 A1  Sep. 28, 2017

(30) Foreign Application Priority Data

Mar. 25, 2016 (JP) ................................ 2016-061978

(51) Int. Cl.
*H04N 9/31* (2006.01)

(52) U.S. Cl.
CPC ......... *H04N 9/3155* (2013.01); *H04N 9/3135* (2013.01); *H04N 9/3161* (2013.01)

(58) Field of Classification Search
CPC ... H04N 9/3155; H04N 9/3135; H04N 9/3161
USPC ....................................................... 348/760
See application file for complete search history.

(56) References Cited

U.S. PATENT DOCUMENTS

| 8,767,023 B2 | 7/2014 | Sakai et al. | |
|---|---|---|---|
| 2013/0207950 A1* | 8/2013 | Haruna | H04N 9/3182 345/207 |
| 2014/0079080 A1* | 3/2014 | Nishioka | G09G 3/02 372/9 |
| 2014/0126590 A1* | 5/2014 | Kimura | H04N 9/3135 372/24 |
| 2014/0253527 A1* | 9/2014 | Ogi | G09G 5/02 345/207 |

FOREIGN PATENT DOCUMENTS

JP   2006-343397 A   12/2006
JP   2012-155020 A   8/2012

* cited by examiner

*Primary Examiner* — Michael Lee
(74) *Attorney, Agent, or Firm* — Mattingly & Malur, PC

(57) ABSTRACT

A laser projection display device 1 includes a laser light source driving unit 4 setting a current which drives a laser light source according to an image signal, a light sensor 10 detecting a light amount of the laser light generated by the laser light source 5, and a light emission control unit 22 emitting light by supplying a standard image signal and a current setting signal to the laser light source driving unit and setting the laser light source driving unit such that the light amount detected by the light sensor becomes a target value. The light emission control unit supplies the current setting signal to the laser light source driving unit such that light emission is performed a plurality of times with a predetermined current difference, in a fly-back period in one frame of the image signal.

6 Claims, 16 Drawing Sheets

F I G. 2
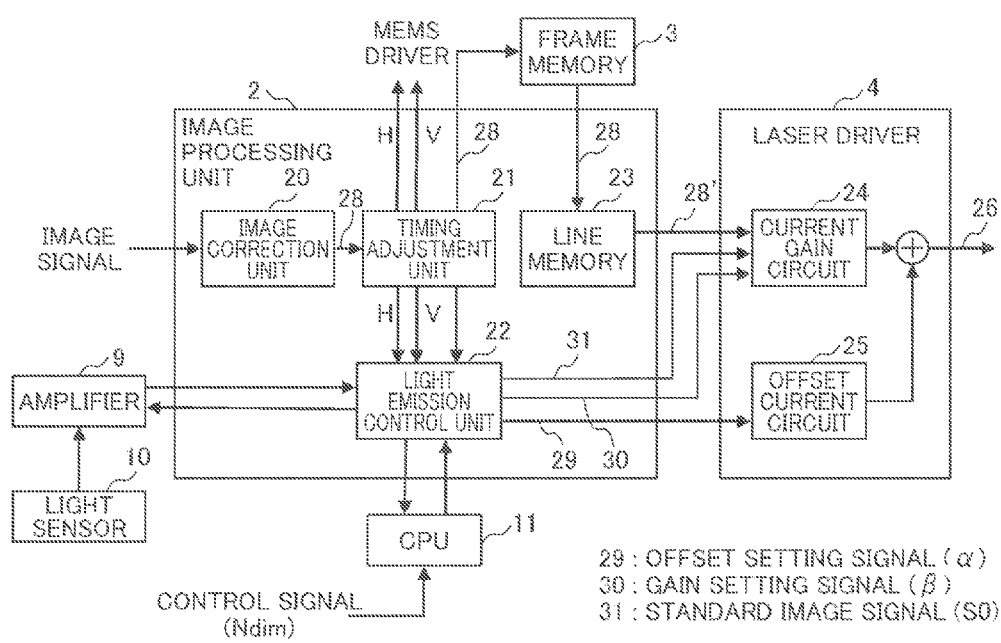

F I G. 4 B

CURRENT SETTING $I0 = \alpha + \beta \times S0$

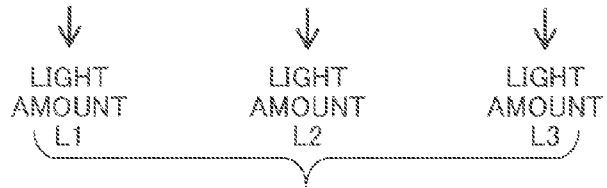

$\alpha$ : OFFSET CURRENT SETTING VALUE
$\beta$ : CURRENT GAIN SETTING VALUE
$S0$ : STANDARD IMAGE SIGNAL

|  | FIRST LIGHT EMISSION | SECOND LIGHT EMISSION | THIRD LIGHT EMISSION |
|---|---|---|---|
| FRAME 1 | B ($\alpha$, $\beta$) | A ($\alpha$, $\beta-1$) | C ($\alpha$, $\beta+1$) |
| FRAME 2 | C ($\alpha'$, $\beta'$) | B ($\alpha'-1$, $\beta'$) | D ($\alpha'+1$, $\beta'$) |
| FRAME 3 | D ($\alpha''$, $\beta''$) | C ($\alpha''$, $\beta''-1$) | E ($\alpha''$, $\beta''+1$) |
| ... | ... | ... | ... |

↓ LIGHT AMOUNT L1
↓ LIGHT AMOUNT L2
↓ LIGHT AMOUNT L3

COMPARED WITH TARGET VALUE P0 IN EACH FRAME

FIG.8(a)

CURRENT SETTING $I1 = \alpha + \beta \times S1$, $I2 = \alpha + \beta \times S2$ $\alpha$ : OFFSET CURRENT SETTING VALUE
$\beta$ : CURRENT GAIN SETTING VALUE
S1, S2 : STANDARD IMAGE SIGNAL

| ONE CYCLE | | FIRST LIGHT EMISSION | SECOND LIGHT EMISSION | THIRD LIGHT EMISSION |
|---|---|---|---|---|
| | FRAME 1 | I1, I2 ($\alpha$−1, $\beta$−1) | I1, I2 ($\alpha$, $\beta$−1) | I1, I2 ($\alpha$+1, $\beta$−1) |
| | | FOURTH LIGHT EMISSION | FIFTH LIGHT EMISSION | SIXTH LIGHT EMISSION |
| | FRAME 2 | I1, I2 ($\alpha$−1, $\beta$) | I1, I2 ($\alpha$, $\beta$) | I1, I2 ($\alpha$+1, $\beta$) |
| | | SEVENTH LIGHT EMISSION | EIGHTH LIGHT EMISSION | NINTH LIGHT EMISSION |
| | FRAME 3 | I1, I2 ($\alpha$−1, $\beta$+1) | I1, I2 ($\alpha$, $\beta$+1) | I1, I2 ($\alpha$+1, $\beta$+1) |

FIG.8(b)

EXAMPLE OF ACQUIRED LIGHT AMOUNT L1, L2    TARGET VALUE P1=100, P2=900

| ONE CYCLE | | FIRST LIGHT EMISSION | SECOND LIGHT EMISSION | THIRD LIGHT EMISSION |
|---|---|---|---|---|
| | FRAME 1 | L1=94, L2=858 | L1=99, L2=863 | L1=104, L2=868 |
| | | FOURTH LIGHT EMISSION | FIFTH LIGHT EMISSION | SIXTH LIGHT EMISSION |
| | FRAME 2 | 97, 878 | 102, 883 | 107, 888 |
| | | SEVENTH LIGHT EMISSION | EIGHTH LIGHT EMISSION | NINTH LIGHT EMISSION |
| | FRAME 3 | 100, 898 | 105, 903 | 110, 908 |

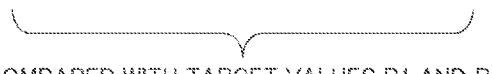

COMPARED WITH TARGET VALUES P1 AND P2
IN ONE CYCLE UNIT

FIG.13(a)

EXAMPLE OF LOOK-AHEAD TARGET LIGHT CONTROL MODE
(CASE OF REMAINING IN MODE 3)

| NUMBER OF FRAMES | CASE OF BRIGHTNESS STAGNANT STATE | CASE OF INCREASING BRIGHTNESS | CASE OF DECREASING BRIGHTNESS |
|---|---|---|---|
| 1 | MODE 3 | MODE 3 | MODE 3 |
| 2 | MODE 3 | MODE 3 | MODE 3 |
| 3 | MODE 3 | MODE 3 | MODE 3 |
| 4 | MODE 3 | MODE 2 | MODE 4 |
| 5 | MODE 3 | MODE 2 | MODE 4 |
| 6 | MODE 3 | MODE 2 | MODE 4 |
| 7 | MODE 4 | MODE 2 | MODE 4 |
| 8 | MODE 4 | MODE 2 | MODE 4 |
| 9 | MODE 4 | MODE 2 | MODE 4 |
| 10 | MODE 2 | MODE 2 | MODE 4 |
| 11 | MODE 2 | MODE 2 | MODE 4 |
| 12 | MODE 2 | MODE 1 | MODE 5 |
| 13 | MODE 5 | MODE 1 | MODE 5 |
| 14 | MODE 5 | MODE 1 | MODE 5 |
| 15 | MODE 1 | MODE 4 | MODE 2 |
| 16 | MODE 1 | MODE 5 | MODE 1 |

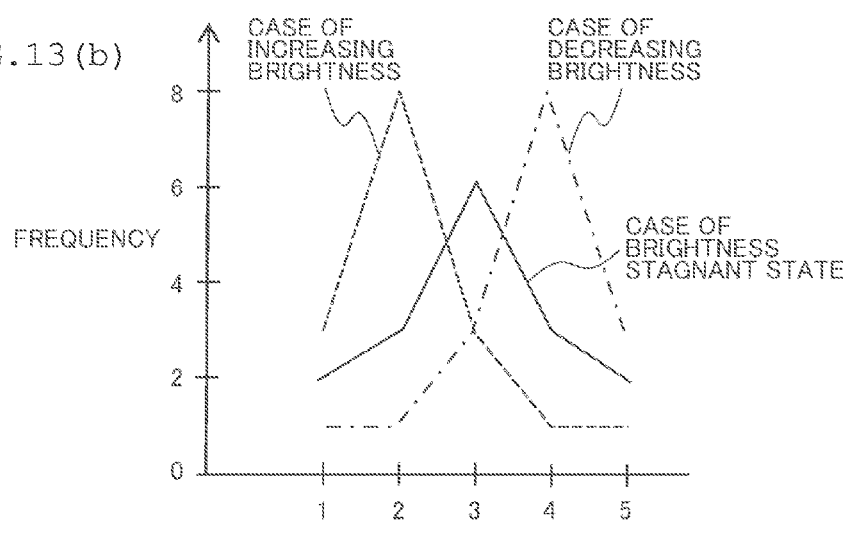

FIG.13(b)

F I G. 1 5
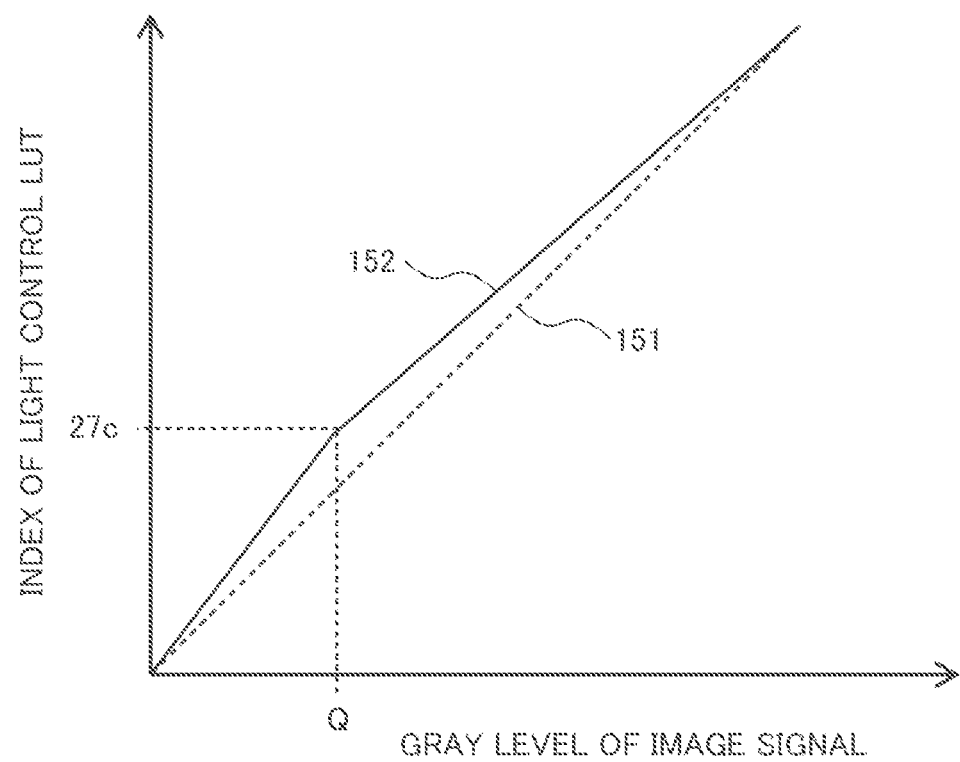

LASER PROJECTION DISPLAY DEVICE

CLAIM OF PRIORITY

The present application claims priority from Japanese patent application serial No. JP 2016-061978, filed on Mar. 25, 2016, the content of which is hereby incorporated by reference into this application.

BACKGROUND OF THE INVENTION (1) Field of the Invention

The present invention relates to a laser projection display device which performs scanning exiting light from a semiconductor laser or the like with a two-dimensional scanning mirror and performs an image display.

(2) Description of the Related Art

Recently, a laser projection display device using a two-dimensional scanning mirror such as a micro electro mechanical systems (MEMS) mirror and a semiconductor laser light source has spread. At this time, technologies as described below have been proposed in order to stabilize the brightness (the luminance) of a video to be display.

For example, in JP 2006-343397 A, a configuration is disclosed in which light emission intensity of laser light is adjusted corresponding to a change in a raster scanning rate in a horizontal direction at the time of performing raster scanning with respect to the laser light by using a biaxial MEMS resonant mirror. In addition, in JP 2012-155020 A, a configuration is disclosed in which a light amount of laser light exiting from a light source is detected by a standard input current value stored in a storage unit in an invalid scanning range out of a valid scanning range which is valid for forming an image, and in a case where the detected light amount is shifted from a standard light amount value stored in the storage unit by greater than or equal to a predetermined value, a video output current value from which the standard light amount value can be obtained, is searched, and a γ table is changed on the basis of a searching result.

SUMMARY OF THE INVENTION

There is a decrease in the intensity of laser light due to time degradation, a variation in the laser light amount due to a temperature change in the surrounding environment, or the like in a semiconductor laser which becomes a light source, and thus, it is necessary to optimally adjust a current which flows into the semiconductor laser and to control the laser light amount such that the laser light amount becomes a target value. In addition, in a general display device, light control processing of controlling the brightness of a display image according to the brightness of the use environment is performed.

The technology described in JP 2006-343397 A is a technology responding to a change in the scanning rate of the laser light on a projection surface, and has no relationship with the variation in the laser light amount. On the other hand, the technology described in JP 2012-155020 A suppress the variation in the laser light amount, and thus, corrects a current which is supplied to the light source by searching a current value in which the light amount of the laser light falls within a range of the standard light amount value (the target value)±a predetermined value (an allowable value). However, in a current value searching method described in JP 2012-155020 A, there is a case where a plurality of values exists according to different searching directions, and naturally, it is inevitable that an error occurs with respect to the target value by the width of a maximum predetermined value (an allowable value). As a result thereof, the light amount obtained from the semiconductor laser is shifted from the target value, and thus, a luminance change or a chromaticity change of a display screen is viewed by a user.

Further, when the brightness (a light control mode) of the display image is changed according to the light control processing, the shift of the luminance occurs on a boundary between different light control modes according to a variation in the light amount of the laser light, and thus, the luminance change or the chromaticity change of the display screen is viewed by the user. The problem of the light control processing is not considered in both of JP 2006-343397 A and JP 2012-155020 A.

The present invention has been made in consideration of the problems described above, and an object of the present invention is to optimize current setting with respect to a semiconductor laser at a normal time and at the time of performing light control processing with higher accuracy, and to stabilize light amount control, in a laser projection display device.

A laser projection display device of the present invention, includes: a laser light source generating laser light of a plurality of colors; a scanning unit scanning the laser light generated by the laser light source according to a synchronization signal of an image signal and projecting an image; a laser light source driving unit setting a current which drives the laser light source according to the image signal; a light sensor detecting a light amount of the laser light generated by the laser light source; and a light emission control unit emitting light by supplying a standard image signal and a current setting signal to the laser light source driving unit and setting the laser light source driving unit such that the light amount detected by the light sensor becomes a target value. The light emission control unit supplies the current setting signal to the laser light source driving unit such that light emission is performed plurality of times with a predetermined current difference, in a fly-back period in which the image signal in one frame of the image signal is not projected.

According to the present invention, it is possible to provide a laser projection display device in which light amount control at a normal time and at the time of performing light control processing is stabilized, and a luminance change or a chromaticity change is rarely viewed by a user.

BRIEF DESCRIPTION OF THE DRAWINGS

These and other features, objects and advantages of the present invention will become more apparent from the following description when taken in conjunction with the accompanying drawings wherein:

FIG. 2 is a block diagram illustrating a signal processing unit of FIG. 1;

FIG. 4B is a diagram illustrating an example of current setting at the time of performing each light emission;

FIGS. 8(a)-8(b) are diagrams illustrating an example of current setting at the time of performing each light emission;

FIGS. 13(a)-13(b) are diagrams illustrating an example of a look-ahead target light control mode according to Example 4;

FIG. 15 is a diagram illustrating an example of an update LUT.

DETAILED DESCRIPTION OF THE EMBODIMENT

Hereinafter, embodiments of the present invention will be described in detail by using the drawings. The following description is for describing an embodiment of the present invention, and does not limit the scope of the present invention. Accordingly, embodiments in which each element or all elements are substituted with the equivalents thereof, can be adopted by a person skilled in the art, and such embodiments are also included in the scope of the present invention.

Example 1

Figure 1:
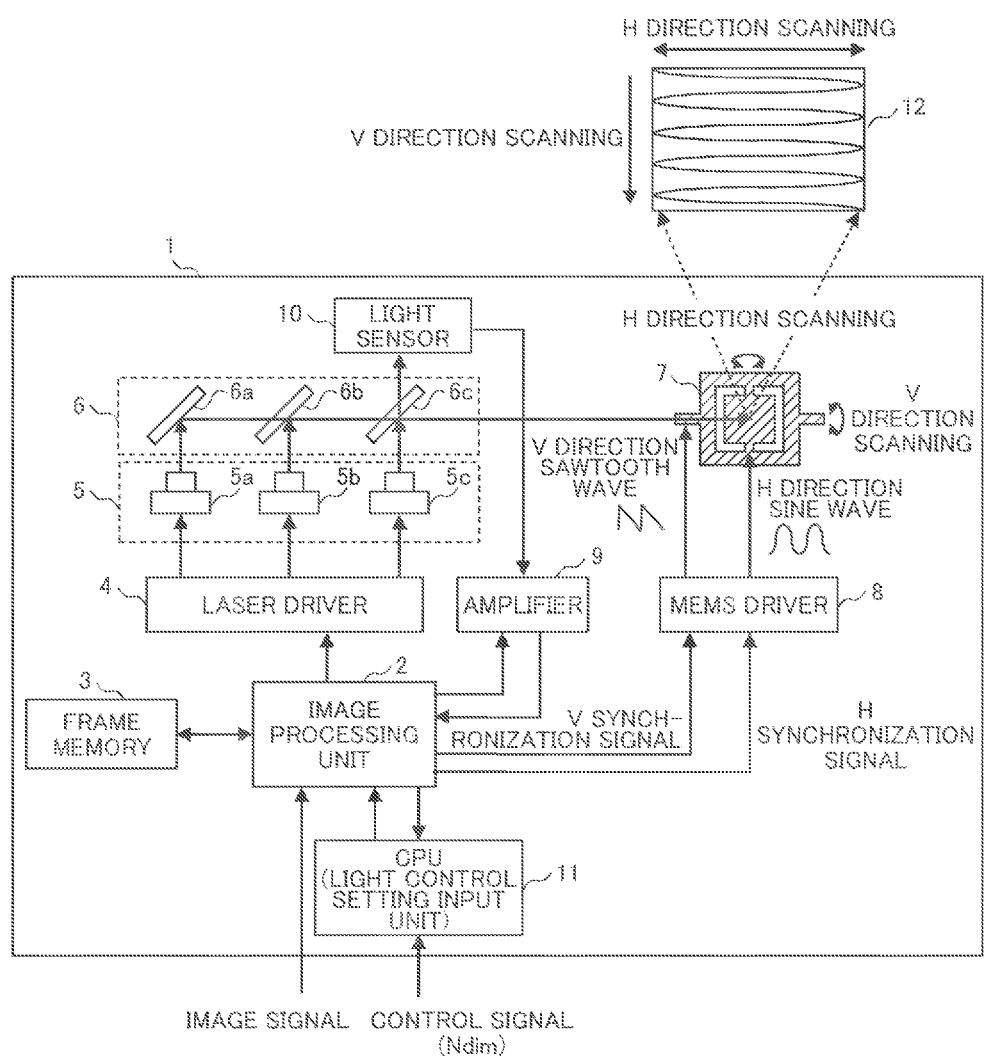
FIG. 1 is a block diagram illustrating an overall configuration of a laser projection display device according to Example 1.

FIG. 1 is a block diagram illustrating the overall configuration of a laser projection display device according to Example 1. A laser projection display device 1 includes an image processing unit 2, a frame memory 3, a laser driver (a laser light source driving unit) 4, a laser light source 5, a reflection mirror 6, a MEMS scanning mirror 7, a MEMS driver 8, an amplifier 9, a light sensor 10, and a central processing unit (CPU) 11, and displays a display image 12 on a projection surface. The configuration and the operation of each unit will be described.

The image processing unit 2 generates an image signal in which an image signal input from the outside is variously corrected, generates a horizontal synchronization signal (an H synchronization signal) and a vertical synchronization signal (a V synchronization signal) synchronized to the image signal, and supplies the signals to the MEMS driver 8. Here, the horizontal synchronization signal and the vertical synchronization signal includes a display period in which the image signal is projected and a fly-back period in which the image signal is not projected, and the display period and the fly-back period include a horizontal display period, a horizontal fly-back period, a vertical display period, and a vertical fly-back period, respectively. Hereinafter, the horizontal display period and the vertical display period will be collectively referred to as a display period, and the horizontal fly-back period and the vertical fly-back period will be collectively referred to as a fly-back period. Here, a period corresponding to one image, which is formed of the vertical display period and the vertical fly-back period, is set to one frame. In addition, the image processing unit 2 controls the laser driver 4 (hereinafter, also referred to as the laser light source driving unit) according to information acquired by the CPU 11, and transmits the image signal which is variously corrected, to the laser driver 4.

Here, the various corrections performed in the image processing unit 2, include a correction of image distortion which is caused by the scanning of the MEMS scanning mirror 7, a brightness change (hereinafter, referred to as light control) or gray adjustment of an image according to a LOOK UP TABLE (hereinafter, referred to as a LUT), and the like. Furthermore, the image distortion occurs due to a difference in relative angles between the laser projection display device 1 and the projection surface, a shift in optical axes between the laser light source 5 and the MEMS scanning mirror 7, or the like. In addition, the details of the light control or the gray adjustment of the image according to the LUT will be described below.

The laser driver 4 receives the image signal which is variously corrected and is output from the image processing unit 2, and modulates a drive current of the laser light source 5 according to the image signal. The laser light source 5, for example, includes three semiconductor lasers 5a, 5b, and 5c for RGB, and allows laser light rays of RGB, corresponding to image signals, to exit to each of RGB of the image signals.

Three laser light rays of RGB are synthesized by the reflection mirror 6 including three mirrors, and are emitted to the MEMS scanning mirror 7. The reflection mirror 6 is configured of a special optical element (a dichroic mirror) which reflects light at a specific wavelength, and transmits light rays at the other wavelengths. Specifically, the reflection mirror 6 includes a dichroic mirror 6a which reflects laser light (for example, R light) exiting from the semiconductor laser 5a and transmits laser light rays of the other colors, a dichroic mirror 6b which reflects laser light (for example, G light) exiting from the semiconductor laser 5b and transmits laser light rays of the other colors, and a dichroic mirror 6c which reflects laser light (for example, B light) exiting from the semiconductor laser 5c and transmits laser light rays of the other colors. Accordingly, one laser light ray is synthesized by the laser light rays of the R light, the G light, and the B light, and is supplied to the MEMS scanning mirror 7.

The MEMS scanning mirror 7 is an image scanning unit including a biaxial rotation mechanism, and is capable of vibrating the center mirror portion in two directions of a horizontal direction and a vertical direction. The vibration of the MEMS scanning mirror 7 is controlled by the MEMS driver 8. The MEMS driver 8 generates a sine wave signal synchronized to the horizontal synchronization signal from the image processing unit 2, generates a sawtooth wave signal synchronized to the vertical synchronization signal, and drives the MEMS scanning mirror 7.

The MEMS scanning mirror 7 receives the sine wave drive signal from the MEMS driver 8 and performs a sine wave resonant motion in the horizontal direction. Simultaneously, the MEMS scanning mirror 7 receives the sawtooth wave drive signal from the MEMS driver 8 and performs a one-directional uniform motion in the vertical direction. Accordingly, the laser light is scanned along a trajectory as illustrated in the display image 12 of FIG. 1, and such a scanning operation is synchronized to a modulation operation of the laser light of the laser driver, and thus, an input image is optically projected.

The light sensor 10 measures a light amount of laser light to be projected, and outputs the measured light amount to the amplifier 9. The amplifier 9 amplifies the output of the light sensor 10 according to an amplification factor which is set by the image processing unit 2, and then, output the amplified output to the image processing unit 2. In FIG. 1, the light sensor 10 detects light leakage of the laser light rays of RGB which are synthesized by the reflection mirror 6. That is, the light sensor 10 is disposed on a side facing the semiconductor laser 5c by interposing the dichroic mirror 6c therebetween. The dichroic mirror 6c has properties of transmitting laser light rays from the semiconductor lasers 5a and 5b and reflecting laser light from the semiconductor laser 5c, but a transmission rate or a reflection rate thereof is not 100%, and several % of the laser light rays from each of the semiconductor lasers is incident on the light sensor 10.

The CPU 11 controls the entire laser projection display device 1, and functions as a light control setting input unit receiving a control signal, for example, information number dimming (Ndim) which determines the brightness of the display image 12, from the outside. In the light control setting input unit, the brightness is controlled by dividing the brightness of the display image into a light control mode and a light control step, on the basis of the information Ndim determining the brightness, and the details thereof will be described below.

FIG. 2 is a block diagram illustrating a signal processing unit of FIG. 1, and is a diagram illustrating internal configurations of the image processing unit 2 and the laser driver 4 in detail.

First, the operation of the image processing unit 2 will be described. The image signal which is input from the outside, is input into an image correction unit 20. The image correction unit 20 performs the correction of the image distortion which is caused by the scanning of the MEMS scanning mirror 7, the light control or the gray adjustment of the image according to the LUT, and the like, with respect to the input image signal. An image signal 28 after being corrected is transmitted to a timing adjustment unit 21.

The timing adjustment unit 21 generates the horizontal synchronization signal (H) and the vertical synchronization signal (V) from the image signal 28 after being corrected, which is input from the image correction unit 20, transmits the horizontal synchronization signal (H) and the vertical synchronization signal (V) to the MEMS driver 8 and a light emission control unit 22. In addition, the image signal 28 is stored in the frame memory 3 first. The image signal 28 written in the frame memory 3 is read out by a read out signal which is synchronized to the horizontal synchronization signal and the vertical synchronization signal generated by the timing adjustment unit 21. As a result thereof, the image signal which is read out from the frame memory 3 is delayed with respect to an image signal to be written, by one frame.

The read out image signal 28 is input into a line memory 23. The line memory 23 captures image signals for one horizontal period, sequentially reads out the image signals in the next horizontal period, and supplies the read out image signals to the laser driver 4 as an image signal 28'. Here, the reason for relaying the line memory 23 is that in a case where there is a difference between a clock frequency at which the image signal 28 is read out from the frame memory 3 and a clock frequency at which the image signal 28' is transmitted to the laser driver 4, the difference is adjusted by a frequency which is written in the line memory 23 and read out from the line memory 23.

The light emission control unit 22 controls the laser driver 4 such that the intensity of laser light to exit becomes a predetermined value, on the basis of a signal in which the light amount acquired by the light sensor 10 is amplified by the amplifier 9. That is, the light emission control unit 22 optimally adjusts a current setting signal with respect to the laser driver 4, such as an offset current setting signal 29 and a current gain setting signal 30, and transmits a standard image signal 31 used for adjustment. Accordingly, a current which flows into the semiconductor laser, is optimally adjusted corresponding to insufficient intensity of laser light due to time degradation, a variation in the laser light amount due to a temperature change in the surrounding environment, and the like, and thus, it is possible to retain a projection image in a constant white balance by allowing the laser light amount to follow a target value.

Next, the operation of the laser driver 4 (the laser light source driving unit) will be described. The laser driver 4 functions as a current setting unit which converts the image signal 28' input from the line memory 23 or the standard image signal 31 input from the light emission control unit 22 into a current value to be supplied to the semiconductor laser 5. For such current setting, the laser driver 4 includes a current gain circuit 24 and an offset current circuit 25.

The current gain circuit 24 multiplies image signal values S of the image signal 28' or the standard image signal 31 and a current gain $\beta$ together, and thus, a signal current value $\beta \times S$ which flows into the semiconductor laser 5, is determined. At this time, the current gain $\beta$ is applied to the current gain setting signal 30 from the light emission control unit 22. The current gain $\beta$ increases and decreases, and thus, a signal current value component proportional to the image signals 28' and 31 increases and decreases.

On the other hand, the offset current circuit 25 determines a lower limit value (an offset component) of the current value which flows into the semiconductor laser 5. At this time, an offset current value $\alpha$ is applied to the offset current setting signal 29 from the light emission control unit 22. The offset current value $\alpha$ is a fixed value independent of the image signals 28' and 31.

The laser driver 4 adds the signal current value $\beta \times S$ which is determined by the current gain circuit 24 and the offset current value $\alpha$ which is determined by the offset current circuit 25 together, and supplies a total current value 26 to the semiconductor laser 5.

Next, a current adjustment method of the light emission control unit 22 will be described in detail. In order to stably display the display image 12, the image signal and exiting intensity of the semiconductor laser need to constantly correspond to each other one-to-one. For this reason, when the standard image signal is input, the current setting is adjusted such that the light amount exiting from the semiconductor laser becomes the target value set in advance. Specifically, the light emission control unit 22 transmits the standard image signal 31 and the current setting signals 29 and 30 as a parameter to the laser driver 4, and thus, the semiconductor laser 5 emits light at various current amounts, and at this time, the light amount is acquired through the light sensor 10 and the amplifier 9. Then, each of the acquired light amounts are compared with the target value, the current setting signals 29 and 30 are determined such that the light amount of the target value can be obtained. At this time, a searching method of optimal conditions will be described by comparing a method of the related art with a method of this example.

Figure 3:
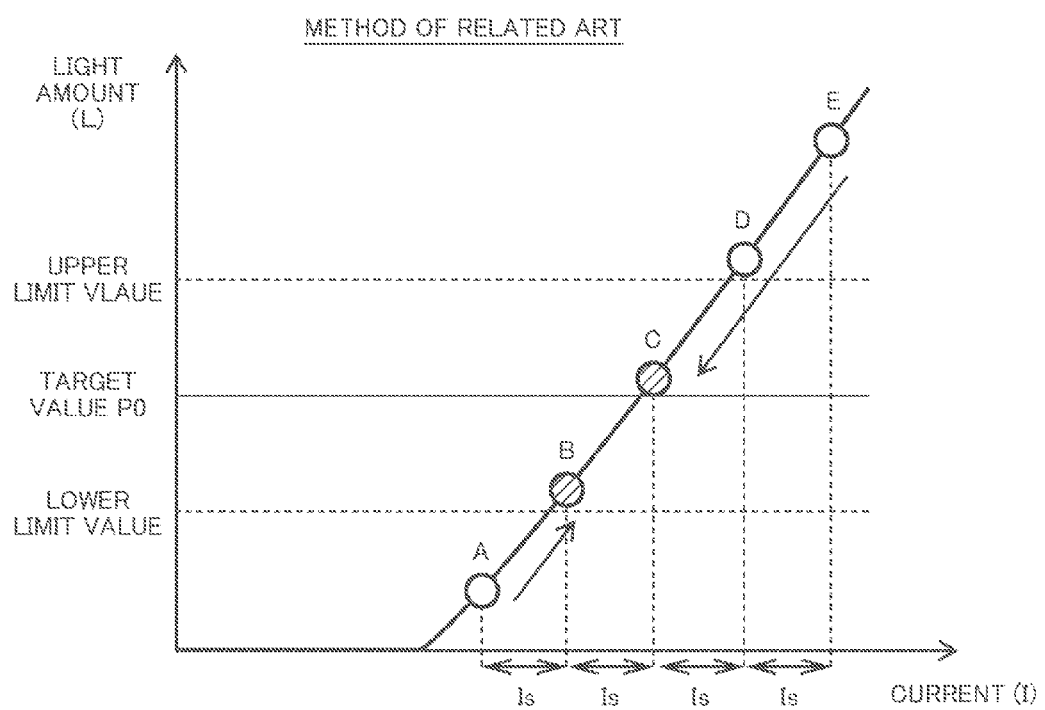
FIG. 3 is a diagram illustrating a current adjustment method of the related art.

FIG. 3 is a diagram illustrating a current adjustment method of the related art by using light amount-forward direction current properties of the semiconductor laser. A straight line in the drawing represents properties of a general semiconductor laser, and points A to E on the straight line are plotted as light amounts of the semiconductor laser at currents which are different from each other by a predetermined current difference Is.

In a searching method of the related art, it is determined whether a light amount to be obtained falls within an allowable range of the target value. In order to perform such searching, light emission may be performed for searching at least once in a fly-back period in the same frame, and the light amount may be acquired. In this case, the light emission control unit 22 stores a target value P0 of the light amount corresponding to the standard image signal, and an upper limit value and a lower limit value which are an allowable range of the light amount, in a storage region (not illustrated), and a current I is changed by the current difference Is until the light amount at the time of performing the light emission in the standard image signal falls between the upper limit value and the lower limit value. An adjustment accuracy is expected to be improved as the current difference Is decreases, whereas an adjustment time (the number of times of light emission for adjustment) increases. Accordingly, the current difference Is is determined in consideration of a balance between the adjustment accuracy and the adjustment time.

For example, in a case where the searching starts from the point E of FIG. 3, a light amount is greater than the upper limit value at the point E, and thus, the current I is decreased by the current difference Is, and the light amount becomes a light amount at the point D. However, the light amount is also slightly greater than the upper limit value at the point D, and thus, the current is decreased again by the current difference Is, and the light amount becomes a light amount at the point C and falls between the upper limit value and the lower limit value. As a result thereof, search type adjustment ends at the point C.

However, in a case where a searching direction is changed, an end point may not be the point C. For example, in a case where the searching starts from the point A, a light amount is less than the lower limit value at the point A, and thus, the current I is increased by the current difference Is, and the light amount becomes a light amount at the point B. Here, the light amount at the point B falls between the upper limit value and the lower limit value, and thus, the search type adjustment ends at the point B.

Thus, in the adjustment method of the related art, it is possible to set the light amount according to the standard image signal to fall between the upper limit value and the lower limit value, but there is a case where a plurality of end points (the point C and the point B) exist. In this example, the point C is closest to the target value P0, but the current setting does not converge on the point C according to the searching direction, and thus, it is difficult to say that the current setting is optimized. As a result thereof, the light amount obtained from the semiconductor laser is shifted from the target value, and a shift of a luminance or a shift of a white balance of a display screen is viewed.

In order to avoid such a problem, a difference between the upper limit value and the lower limit value which are the allowable range may be set to be small, but in a case where the difference is excessively small, the control is not stabilized due to a noise component of the light sensor 10 or the amplifier 9. In addition, the searching is performed while changing the current I by the predetermined current difference Is, there is a case where a value does not exist between the upper limit value and the lower limit value.

As described above, in the searching method of the related art, it is not possible to necessarily optimally adjust the current amount corresponding to the standard image signal.

Therefore, a current is changed with respect to the standard image signal, and the light emission for adjustment is performed a plurality of times, in this example, in a fly-back period in each frame, and a current at which the light amount closest to the target value P0 can be obtained, is obtained from the changed currents, and thus, current setting of the next frame is performed.

Hereinafter, current setting processing of this example will be described by using FIG. 4 to FIG. 6. In the following example, the current is changed and the light emission for adjustment is performed three times, in a fly-back period corresponding to one frame of the image signal.

Figure 4A:
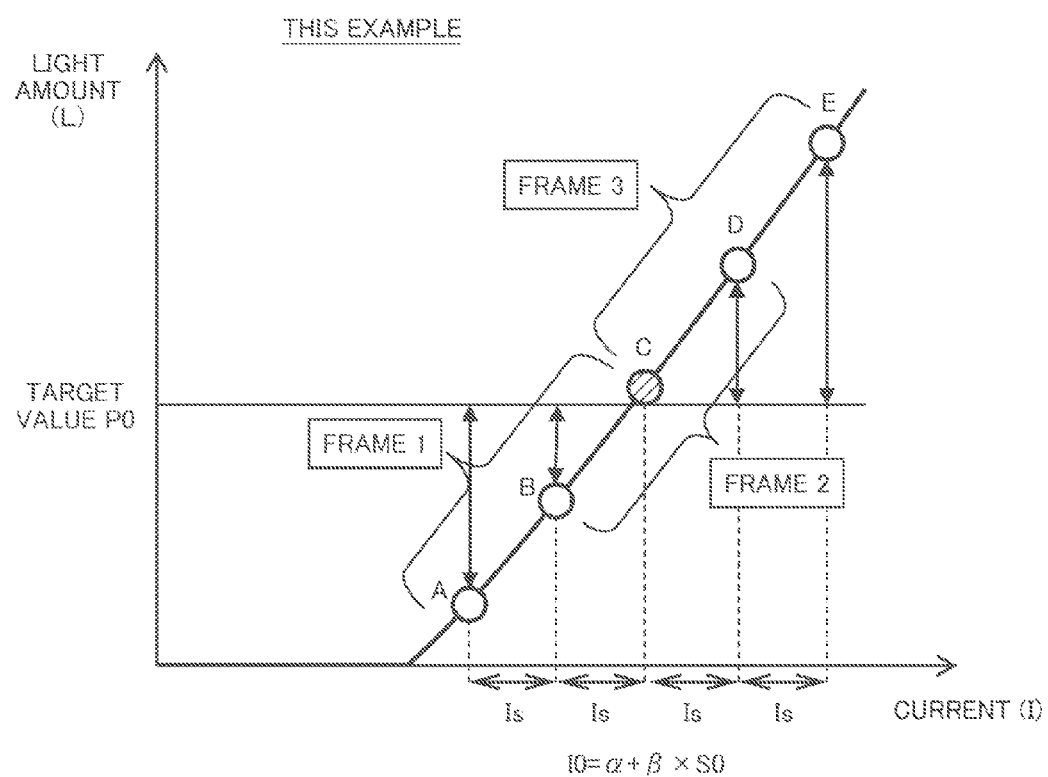
FIG. 4A is a diagram illustrating a current setting method according to Example 1.

FIG. 4A is a diagram illustrating a current setting method according to Example 1 by using the light amount-forward direction current properties of the semiconductor laser. As with FIG. 3, points A to E on a straight line are plotted as light amounts of the semiconductor laser at currents which are different from each other by the predetermined current difference Is.

In this example, the light emission is performed at three adjacent points in the fly-back period in each of the frames. That is, light emission is performed at a set of points A, B, and C in a fly-back period of frame 1, the light emission is performed at a set of points B, C, and D in a fly-back period of a frame 2, and the light emission is performed at a set of points C, D, and E in a fly-back period of a frame 3. Then, three light amounts obtained in each of the frames are compared with the target value P0, a current which is closest to the target value P0, is obtained, and then, the current setting is substituted with current setting of the next frame. For example, in a case where the point C is closest to the target value P0 as a result of performing the light emission at the points A, B, and C in the frame 1, the current is set to the point C.

In the next frame, the light emission is performed at three points including the present current setting. For example, the procedure is set such that the light emission is performed at the points B, C, and D including the point C which is set at present, in the frame 2. In a case where the point D is closest to the target value P0 as a result of performing the light emission in the frame 2, the light emission is performed at the points C, D, and E including the point D, in the frame 3. According to such a method, it is possible to allow the current setting to converge on the point C which is closest to the target value P0 of the light amount, by the light emission in one frame or the light emission over a plurality of frames.

In the method of the related art illustrated in FIG. 3, a point on which the current setting finally converges is different between a case of starting from the point A and a case of starting from the point E. In contrast, in the method of this example, a start position is not limited to the set of the points A, B, and C, and even in a case of starting from the set of points C, D, and E or even in a case of starting from the points B, C, and D, it is not necessary to repeat the adjustment in a plurality of frames, and thus, the current setting converges on the point C which is closest to the target value P0 of the light amount. Obviously, the same applies to a case of starting from a set including a current amount less than the point A and a current amount greater than the point E.

FIG. 4B is a diagram illustrating an example of current setting at the time of performing each light emission in FIG. 4A. When the offset current setting value is set to $\alpha$, the current gain setting value is set to $\beta$, and the standard image signal is set to S0, a current value I0 at the time of performing the light emission is represented by $I0 = \alpha + \beta \times S0$.

Then, α and β are changed as a parameter, and thus, the current value I0 is changed. In order for simplicity, in a case any one of the parameters α and β is changed by a unit amount of 1, each value is standardized such that the current value I0 is changed by the current difference Is. Thus, there are two parameters which determine the current value I0, and thus, the parameters are alternately changed as described below.

When the parameter is set to (α, β) in first light emission (the point B) of the frame 1, the parameter is set to (α, β−1) in second light emission (the point A), and thus, the current is decreased by Is, and the parameter is set to (α, β+1) in third light emission (the point C), and thus, the current is increased by Is. In the next frame 2, when the parameter is set to (α', β') in the first light emission (the point C), the parameter is set to (α'−1, β') in the second light emission (the point B), and thus, the current is decreased by Is, and the parameter is set to (α'+1, β') in the third light emission (the point D), and thus, the current is increased by Is. Further, in the next frame 3, a parameter β″ is changed. Thus, here, the parameters α and β are alternately changed, and which parameter is changed in each of the frames may be determined on the basis of the light amount-forward direction current properties of the semiconductor laser, in consideration of the contribution of both sides.

Figure 5:
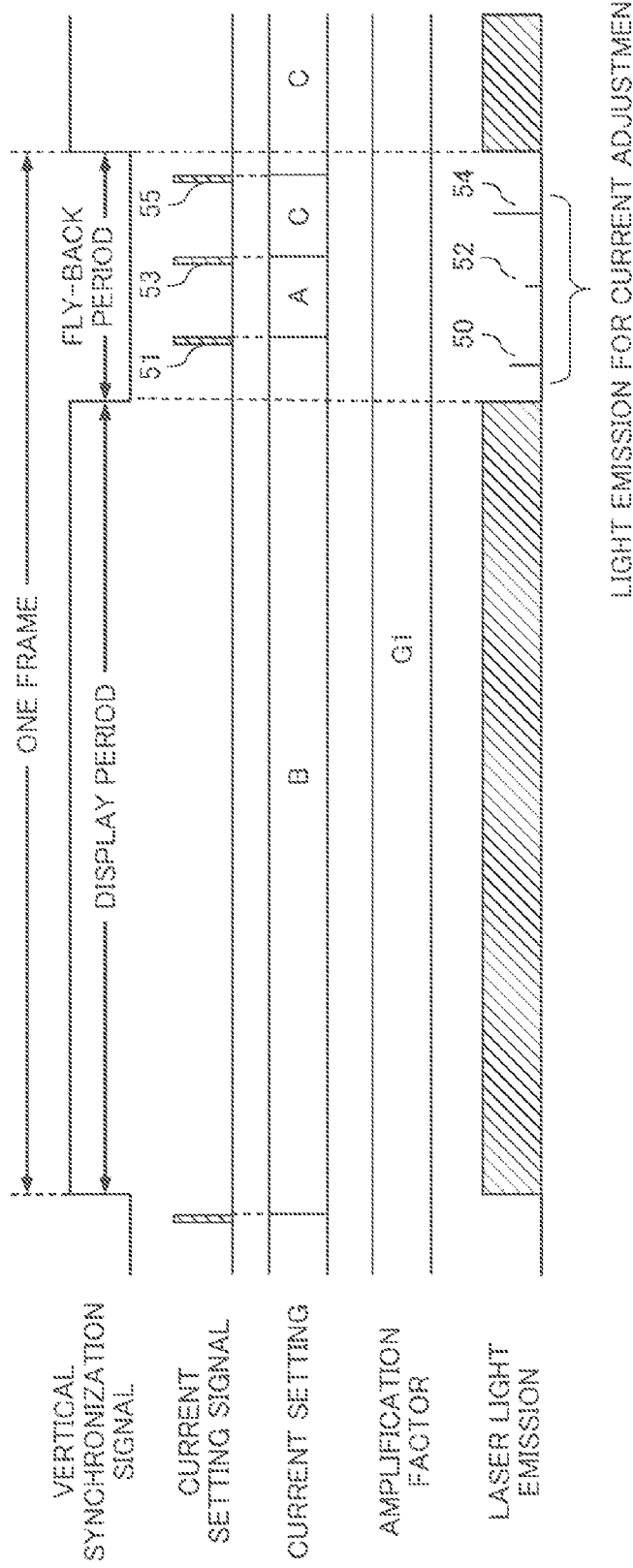
FIG. 5 is a diagram illustrating a timing chart of current setting processing.

FIG. 5 is a diagram illustrating a timing chart of the current setting processing, and illustrates items of the vertical synchronization signal, the current setting signal, the current setting, the amplification factor, and actual laser light emission. Here, the current setting in a display period is set to the point B of FIG. 4A, and three laser light emissions 50, 52, and 54 are performed at the point A and the point C including the point B in a vertical fly-back period of one frame. The first laser light emission 50 is set to the current setting (the point B) in the display period, and current setting signals 51 and 53 are applied for the next laser light emissions 52 (the point A) and 54 (the point C). The current setting (for example, the point C) which is used in the next frame is determined from the results of three laser light emissions, and a current setting signal 55 is applied. The same repeatedly performed in the next frame.

Figure 6:
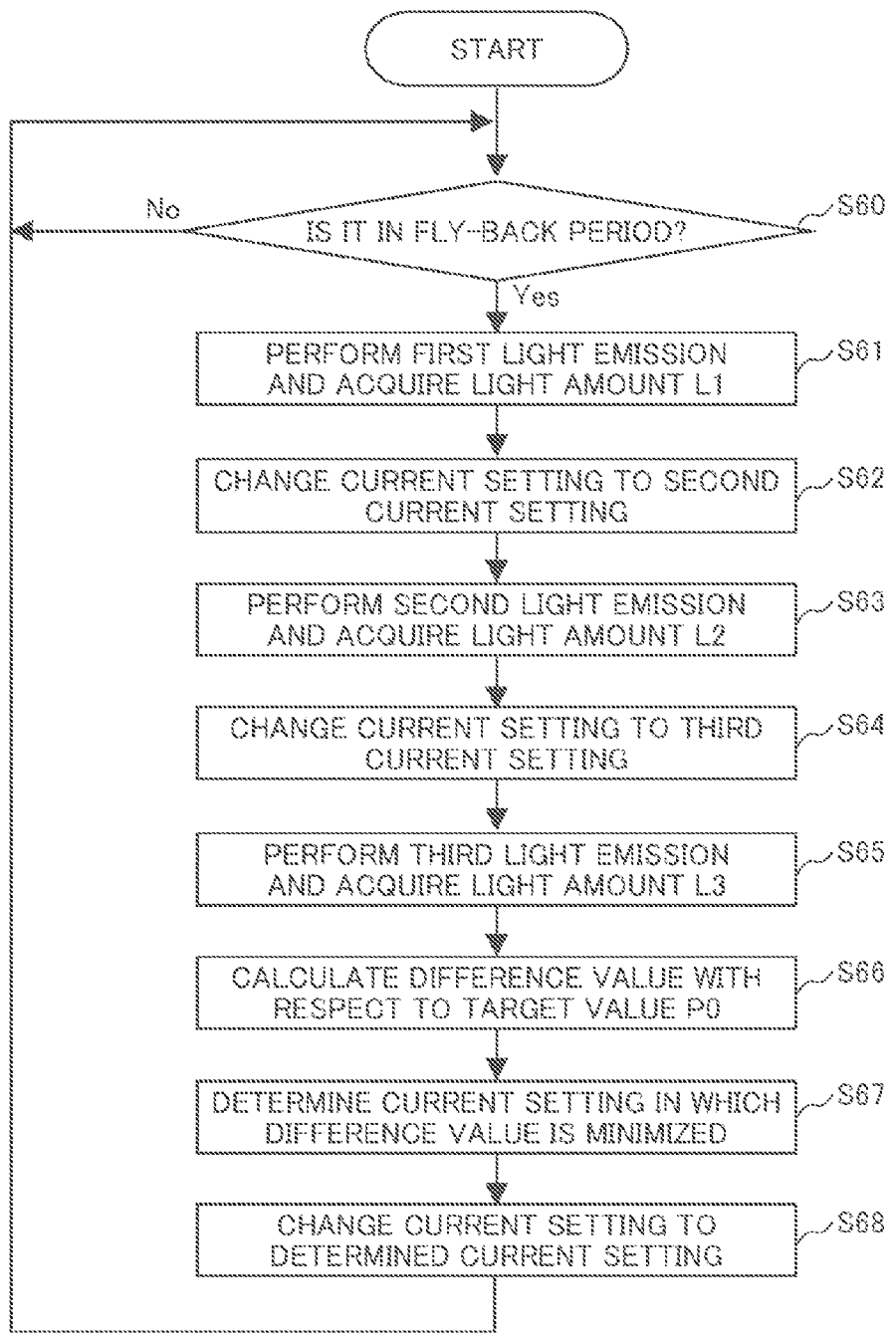
FIG. 6 is a diagram illustrating a flowchart of the current setting processing.

FIG. 6 is a diagram illustrating a flowchart of the current setting processing by citing FIG. 4A and FIG. 5. The following operation is controlled by the light emission control unit 22.

In S60, the light emission control unit 22 determines whether or not it is in the fly-back period. In a case where it is determined that it is not in the fly-back period, the process waits until it is in the fly-back period, and in a case where it is determined that it is in the fly-back period, the process proceeds to S61. In S61, the first light emission 50 corresponding to the standard image signal S0 is performed, and thus, a first light amount L1 is acquired (the point B of FIG. 4A).

In S62, the current setting signal 51 is transmitted, and the current setting is changed to second current setting. Accordingly, the current setting is changed from the point B to the point A. In S63, the second light emission 52 corresponding to the standard image signal S0 is performed, and thus, a second light amount L2 is acquired (the point A of FIG. 4A).

In S64, the current setting signal 53 is transmitted, and the current setting is changed to third current setting. Accordingly, the current setting is changed from the point A to the point C. In S65, the third light emission 54 corresponding to the standard image signal S0 is performed, and thus, a third light amount L3 is acquired (the point C of FIG. 4A).

In S66, the obtained three light amounts L1, L2, and L3 are compared with the target value P0, and each difference value is calculated. In S67, current setting in which the difference value is minimized, is obtained, and is determined as current setting of the next frame. In examples of FIG. 4A and FIG. 5, the difference value is minimized at the point C, and the current setting is determined as the point C. In S68, the current setting signal 55 is transmitted, and the current setting of the display period of the next frame is changed to the point C. After that, the process returns to S60, and a set of current setting processings are repeated.

As described above, in this example, the light emission is performed three times in a fly-back period corresponding to one frame, and the optimal value of the current setting is obtained, and thus, the time required for optimization is reduced, and the adjustment is accelerated. Here, a case where the light emission is performed three times, is exemplified, but it is obvious that the light emission may be performed at least two times.

It is possible to set the current difference Is at the time of performing the searching to be smaller, and to improve the adjustment accuracy, according to a reduction in the adjustment time. That is, it is preferable that the current difference Is at the time of performing the searching is a minimum current difference which can be set by the current gain circuit 24 or the offset current circuit 25, or current difference less than or equal to two times the minimum current difference.

In addition, the current difference Is at the time of performing the searching is realized by the current setting signals 29 and 30 which are transmitted to the laser driver 4 by the light emission control unit 22, and may be realized by a method other than the above. For example, the current difference Is at the time of performing the searching can be realized by fixing the current setting signals 29 and 30, and by changing the standard image signal 31 which is transmitted to the laser driver 4. In this case, image signals ΔS corresponding to change amounts Δα and Δβ of the parameters α and β may be added to or subtracted from the standard image signal S0. Specifically, the image signals equivalent to Δα and Δβ are ΔS=Δα/β and ΔS=Δβ×S0/β, respectively.

According to Example 1, the light emission for adjustment is performed a plurality of times with the predetermined current difference Is in the fly-back period corresponding to one frame of the image signal, and thus, it is possible to optimize the current setting with respect to the image signal with a higher accuracy. Accordingly, the light amount control is stabilized, the same current setting processing is performed with respect to all colors, and thus, it is possible to provide a laser projection display device in which a chromaticity change is suppressed, and a color change is rarely viewed by a user.

Example 2

In Example 1, processing of optimizing the current setting with respect to one standard image signal S0 has been described. In contrast, in Example 2, processing of simultaneously optimizing current setting with respect to two standard image signals S1 and S2 will be described. That is, the current setting is performed such that a light amount which is closest to two corresponding light amount target values P1 and P2 set in advance, can be obtained. Accordingly, it is possible to stably display the display image 12 over image signals in a wide range, compared to Example 1.

Hereinafter, the current setting processing of Example 2 will be described by using FIG. 7 and FIGS. 8(a) and 8(b). Furthermore, a device configuration and a signal processing unit are in common with those of Example 1 (FIG. 1 and FIG. 2), and the detailed description thereof will be omitted.

Figure 7:
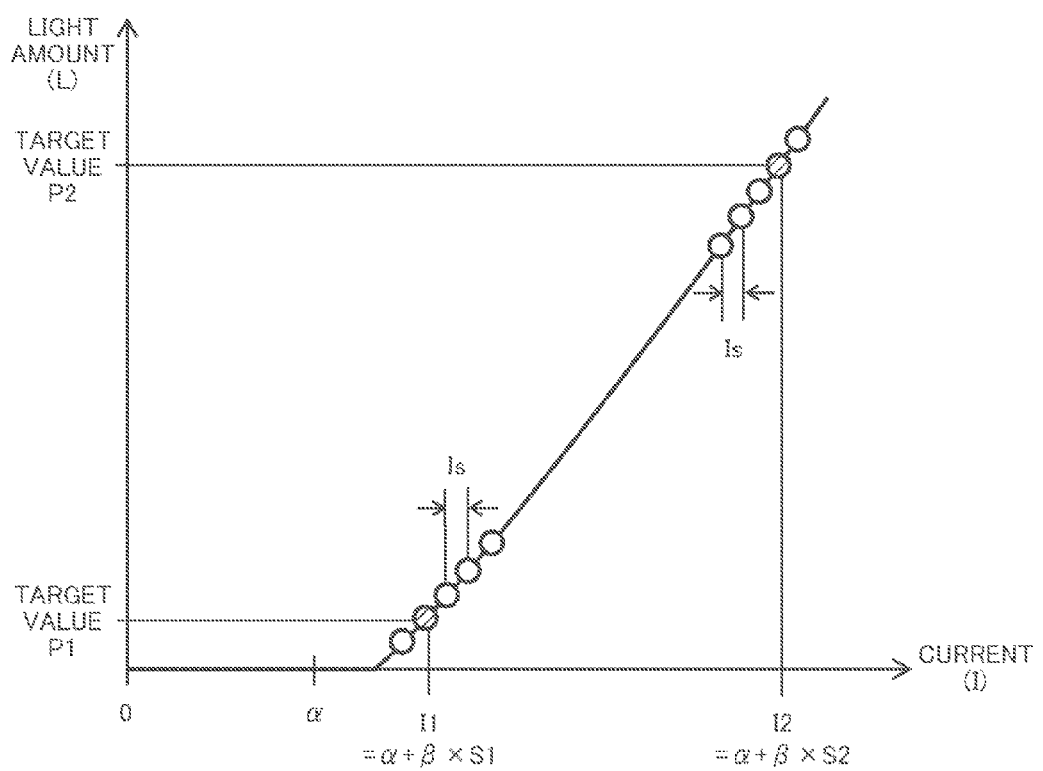
FIG. 7 is a diagram illustrating a current setting method according to Example 2.

FIG. 7 is a diagram illustrating a current setting method according to Example 2 by using the light amount-forward direction current properties of the semiconductor laser again. Here, two points (for example, the vicinity of a black level and the vicinity of a white level) having different light amounts are set on a straight line of light amount properties, and a light amount target value P1 (the black level) corresponding to the first standard image signal S1 and a light amount target value P2 (the white level) corresponding to the second standard image signal S2 are set. Such values are stored in the storage region in the light emission control unit 22.

In a case where a current setting value of the laser driver 4, that is, the offset current setting value is set to $\alpha$, and the current gain setting value is set to $\beta$, a current amount I1 corresponding to the first standard image signal S1 is $\alpha+\beta \times S1$, and a current amount I2 corresponding to the second standard image signal S2 is $\alpha+\beta \times S2$. Thus, both of the current amounts I1 and I2 corresponding to the first standard image signal S1 and the second standard image signal S2 are determined by the common offset current setting value $\alpha$ and the common current gain setting value $\beta$. In other words, light amounts exiting corresponding to the first standard image signal and the second standard image signal are affected by the common offset current setting value $\alpha$ and the common current gain setting value $\beta$.

Therefore, in this example, the light emission control unit 22 transmits the current setting signals 29 and 30 to the laser driver 4 such that the light emission for adjustment is performed a plurality of times by a predetermined current difference Is, in the fly-back period corresponding to one frame of the image signal, light emissions corresponding to two standard image signals are performed in each current setting. In the following example, the light emission is performed three times (that is, the light emission is performed six times in total) with the current difference Is, with respect to each of the first standard image signal S1 and the second standard image signal S2. In addition, in order to apply the current difference Is, nine combinations of changes of the offset current setting value $\alpha$ and the current gain setting value $\beta$ are set, and three combinations each are performed in three frames. That is, the light emission of 6×3=18 times in total is repeated as one cycle, and thus, the current setting is optimized.

FIGS. 8(a)-8(b) are diagrams illustrating an example of current setting at the time of performing each light emission, and sets the frames 1 to 3 as one cycle. FIG. 8(a) illustrates an example of the current setting in one cycle, and FIG. 8(b) illustrates an example of a light amount acquired in one cycle.

In the current setting of FIG. 8(a), in the frame 1, the current gain setting value is fixed to $\beta-1$, and the offset current setting value is changed to $\alpha-1$, $\alpha$, and $\alpha+1$, and thus, the current amounts I1 and I2 corresponding to the first standard image signals S1 and the second standard image signal S2 are changed. In the frame 2, the current gain setting value is fixed to $\beta$, and the offset current setting value is changed to $\alpha-1$, $\alpha$, and $\alpha+1$, and the current amounts I1 and I2 are similarly changed. In the frame 3, the current gain setting value is fixed to $\beta+1$, and the offset current setting value is changed to each of $\alpha-1$, $\alpha$, $\alpha+1$, and thus, the current amounts I1 and I2 are similarly changed. As described in Example 1, in a case where each of the parameters $\alpha$ and $\beta$ is increased and decreased by the unit amount of 1, the current amounts I1 and I2 are changed by the current difference Is. Accordingly, nine current amounts I1 and I2 can be set with respect to the first standard image signal S1 and the second standard image signal S2, with the current difference Is.

FIG. 8(b) is an example of the acquired light amount, and illustrates light amounts L1 and L2 which are respectively obtained with respect to current amounts I1 and I2. Here, the light amount target values P1 and P2 with respect to the first standard image signal S1 and the second standard image signal S2 are P1=100 and P2=900.

The obtained nine light amounts L1 and L2 are compared with each of the target values P1 and P2, and a difference value with respect to the target value is calculated. Then, current setting is obtained in which a sum of the difference values of the light amounts L1 and L2 is minimized. In an example of FIG. 8(b), in a case of seventh light emission in the frame 3, the sum of the difference values with respect to the target value is minimized. Accordingly, the offset current setting value $\alpha-1$ and the current gain setting value $\beta+1$ are determined as an optimal value, which are the current setting at this time, and are applied to the current setting of the next frame.

Furthermore, the combination of the changes of the offset current setting value $\alpha$ and the current gain setting value $\beta$, illustrated in FIG. 8(a), is an example, and may be suitably determined according to the light amount-forward direction current properties of the semiconductor laser, in consideration of the contribution of both sides.

According to Example 2, the current setting with respect to two standard image signals having two different signal levels is simultaneously optimized, and thus, it is possible to stabilize the light amount control over image signals in a wide range. Obviously, the same current setting processing is performed with respect to all colors, and thus, it is possible to provide a laser projection display device in which a chromaticity change is suppressed, and a color change is rarely viewed by a user.

Here, the optimization is performed with respect to two standard image signal, but it is obvious that the optimization can be performed with respect to two or more standard image signals, and the light amount control is stabilized.

Example 3

In Example 3, a method of suppressing a luminance change and a chromaticity change at the time of performing the light control processing will be described. As with a general display device, the laser projection display device has a light control processing function of adjusting a display luminance in a wide range in order to display an image with a suitable brightness according to the brightness of the use environment. For this reason, the information number dimming (Ndim) determining the brightness of the image is input into the light control setting input unit. Then, the light control mode corresponding to a discrete brightness, and the light control step partitioning the light control mode into a plurality of brightnesses are allocated according to the information Ndim. In each of the light control modes, the Look Up Table (LUT) coincident with the light amount-forward direction current properties of the laser is provided, and a light control amount is read out from the LUT, and thus, meticulous light control processing is performed.

However, it is not easy to set the LUT such that luminances and chromaticities on a boundary between different light control modes are coincident with each other, and a brightness change or a color change is viewed by the user at the time of performing transition to a different light control mode. There, in Example 3, transition intensity determination processing is performed, on the boundary between the light control modes, and thus, the luminance change and the chromaticity change are suppressed at the time of performing the light control processing, and the brightness change and the color change are rarely viewed by the user. Furthermore, the same reference numerals are applied to components having the same configuration and the same function as those of Example 1, and the detailed description will be omitted.

Figure 9:
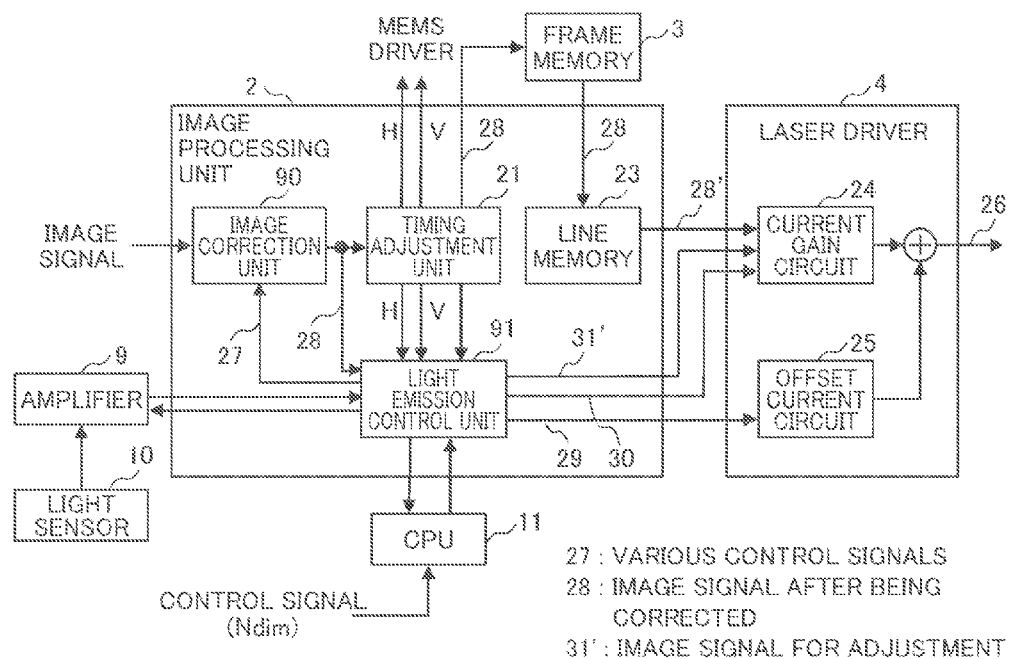
FIG. 9 is a block diagram illustrating a configuration of a signal processing unit according to Example 3.

FIG. 9 is a block diagram illustrating the configuration of a signal processing unit according to Example 3, and corresponds to the internal configurations of the image processing unit 2 and the laser driver 4 of Example 1 (FIG. 2). In a case of FIG. 2, operations of an image correction unit 90 and a light emission control unit 91 in the image processing unit 2 are different, and the light emission for adjustment is performed in order to update the LUT referred to by the light control processing. For this reason, the exchange of various control signals 27 described below and the image signal 28 after being corrected is performed between the light emission control unit 91 and the image correction unit 90.

Figure 10:
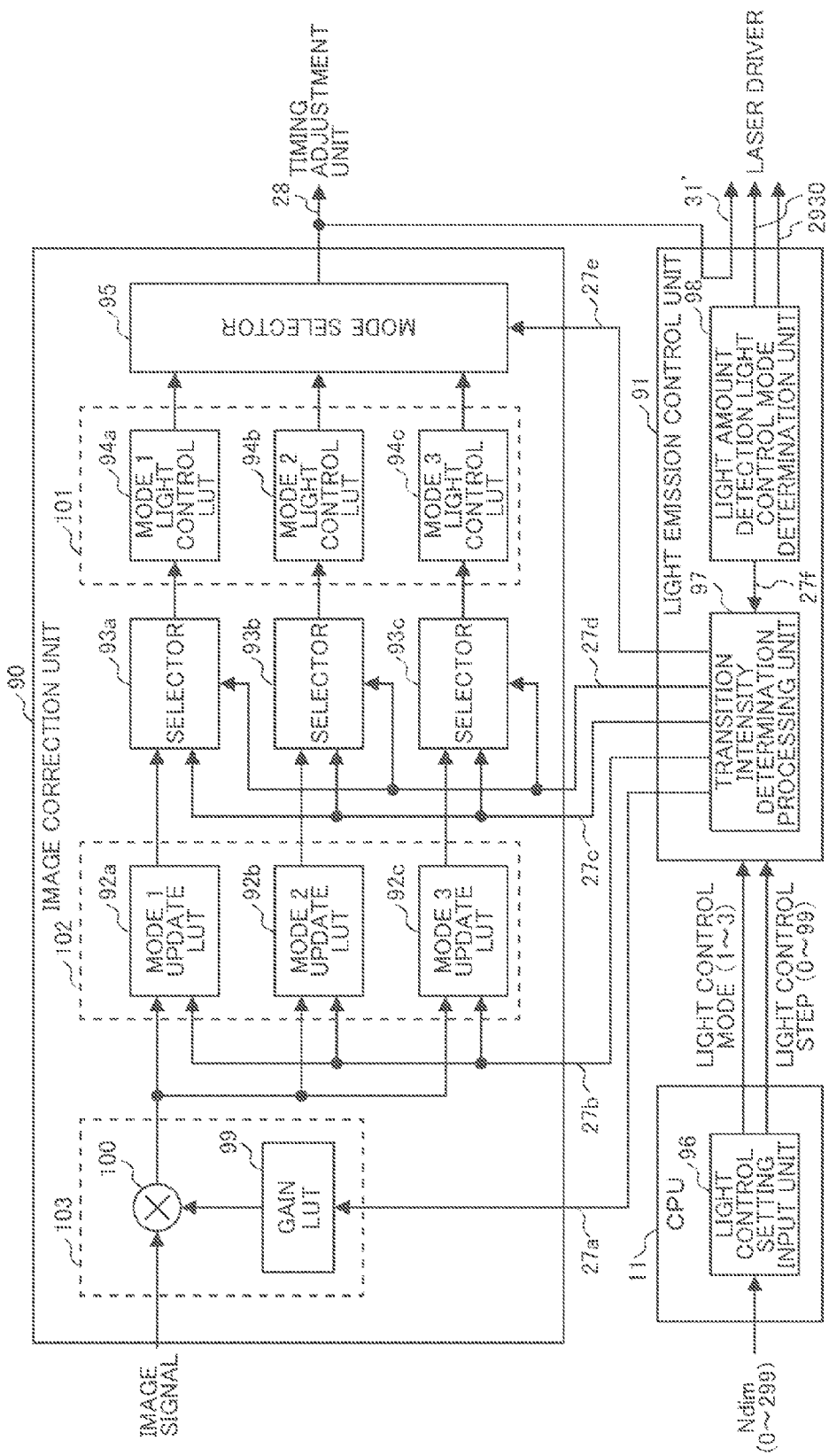
FIG. 10 is a diagram illustrating internal configurations of an image correction unit and a light emission control unit of FIG. 9.

FIG. 10 is a diagram illustrating internal configurations of the image correction unit 90 and the light emission control unit 91 of FIG. 9.

First, the information Ndim determining the brightness of the display image 12 is input into the CPU 11 from the outside. A light control setting input unit 96 in the CPU 11 divides and allocates the brightness of the display image into the light control mode and the light control step according to the input information Ndim, and transmits the information to the light emission control unit 91. In an example of FIG. 10, three discrete light control modes are provided, a light control mode 1 to a light control mode 3 are set from a bright side, and each of the light control modes is divided into one hundred light control steps. That is, in a case where the input information Ndim is represented by numerals of 0 to 299 (0 is the brightest), the light control setting input unit 96 allocates numerals of 0 to 99 to the light control mode 1, numerals of 100 to 199 to the light control mode 2, and numerals of 200 to 299 to the light control mode 3, and transmits information (1 to 3) of each of the light control modes, and information (0 to 99) of the light control step to the light emission control unit 91.

The light emission control unit 91 includes a transition intensity determination processing unit 97 and a light amount detection light control mode determination unit 98. The transition intensity determination processing unit 97 transmits various control signals 27 (a light control step signal 27a or the like) for performing the light control processing to the image correction unit 90, according to the information of the light control mode or the light control step, which is transmitted from the light control setting input unit 96. The light amount detection light control mode determination unit 98 determines a light control mode (hereinafter, referred to as a look-ahead target light control mode) having a possibility of next transition, and transmits information 27f of the look-ahead target light control mode to the transition intensity determination processing unit 97.

Next, the configuration of the image correction unit 90 will be described. The image correction unit 90 is configured of three light control processing units described below.

A first light control processing unit 101 is configured of a plurality of light control LUTs (94a to 94c) storing the light control amount as a table value by using a gray level of the image signal as an index, in each of the divided light control modes.

A second light control processing unit 102 is configured of updatable a plurality of update LUTs (92a to 92c) which are capable of obtaining an index of the light control LUTs (94a to 94c) by using the gray level of the image signal as an index, in each of the divided light control modes. Here, each of the update LUTs (92a to 92c) is updated by an update signal 27b which is transmitted by the transition intensity determination processing unit 97, and the details thereof will be described below.

A third light control processing unit 103 is configured of a gain LUT 99 which retains a gain corresponding to the light control step, and a multiplier 100 which is capable of obtaining an index of the update LUTs (92a to 92c) by multiplying the image signal and the gain together. Here, the gain LUT 99 is a LUT having digital data dividing a difference in the brightness in the light control mode into the hundred light control steps, and sets the light control step signal 27a which is transmitted by the transition intensity determination processing unit 97, as an index.

Further, the image correction unit 90 includes selectors (93a to 93c) selecting the output of the update LUTs (92a to 92c) or a transition signal value 27c transmitted from the transition intensity determination processing unit 97 as an index which is input into the first light control processing unit 101. Each of the selectors (93a to 93c) is controlled by a selection signal 27d which is transmitted from the transition intensity determination processing unit 97. In addition, the image correction unit 90 includes a mode selector 95 selecting which light control LUT value of the first light control processing unit 101 is output as the image signal 28 after being corrected. The mode selector 95 is controlled by a mode selection signal 27e which is transmitted from the transition intensity determination processing unit 97.

Hereinafter, the transition intensity determination processing of this example will be described. The transition intensity determination processing is performed such that the brightness change or the color change is rarely viewed at the time of performing transition to a different light control mode, and corrects the update LUT such that light amounts in the light control step on the boundary between the light control modes are compared with each other, and light amounts to be obtained are coincident with each other.

Figure 11:
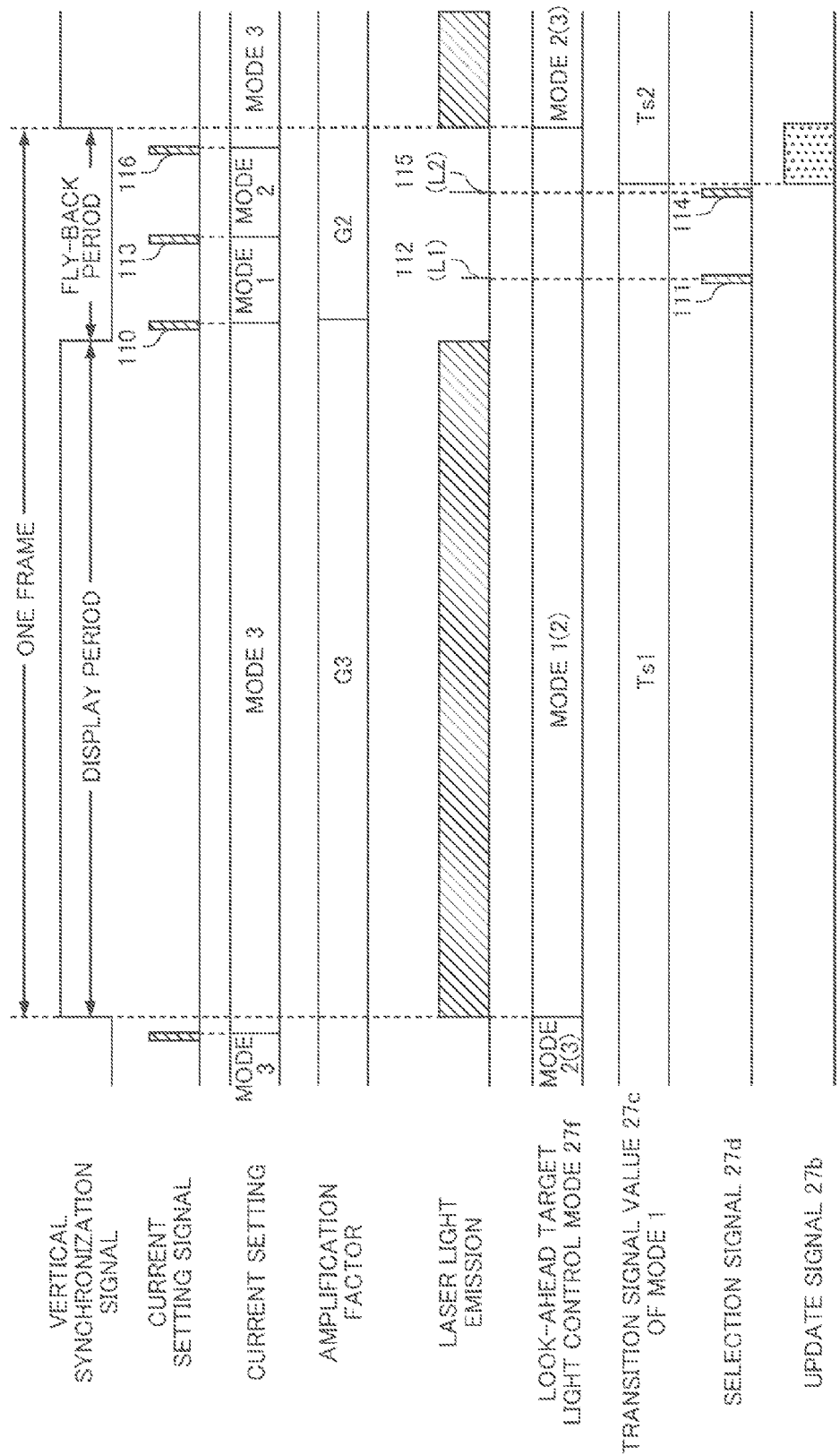
FIG. 11 is a diagram illustrating a timing chart of transition intensity determination processing.

FIG. 11 is a diagram illustrating a timing chart of the transition intensity determination processing, and illustrates the vertical synchronization signal, the current setting signal, the current setting, the amplification factor, the laser light emission, the information 27f of the look-ahead target light control mode, the transition signal value 27c of the mode 1, the selection signal 27d, and the update signal 27b.

In this example, the display period is a case where the light control mode 3 is selected, and the light control mode 1 is selected as a look-ahead target. In this case, the transition intensity determination processing is processing in which light amounts in the light control step on a boundary between the light control mode 1 and the light control mode 2 are coincident with each other. That is, in the light control mode 1, an output value of the update LUT is changed to the transition signal value 27c with respect to the index of the update LUT corresponding to the darkest light control step 99, and thus, the luminance is coincident with that of a case of the brightest light control step 0 in the light control mode 2. For this reason, in the fly-back period, light emission 112 of the light control mode 1 on the boundary and light emission 115 of the light control mode 2 are performed, the transition signal value 27c increases and decreases such that light amounts of both of the light emissions are coincident with each other. Then, the transition signal value 27c at which the light amounts of both of the light emissions are coincident with each other, is transmitted to the update LUT as the update signal 27b.

FIG. 15 is a diagram illustrating an example of the update LUT. A straight line (illustrated by a dotted line) which is represented by a reference numeral of 151 is an example of the update LUT before being correct, and a straight line (illustrated by a solid line) which is represented by a reference numeral of 152 is an example of the update LUT after being corrected. In FIG. 15, a point Q corresponds to a maximum gray level of the image signal in the darkest light control step 99. The output at the point Q is the transition signal value 27c which is the index of the update LUT. In addition, the update LUT 152 after being corrected is prepared by linear interpolation which connects an original point and a point of a maximum value to each other with a central focus on the point (Q, the transition signal value 27c).

Figure 12:
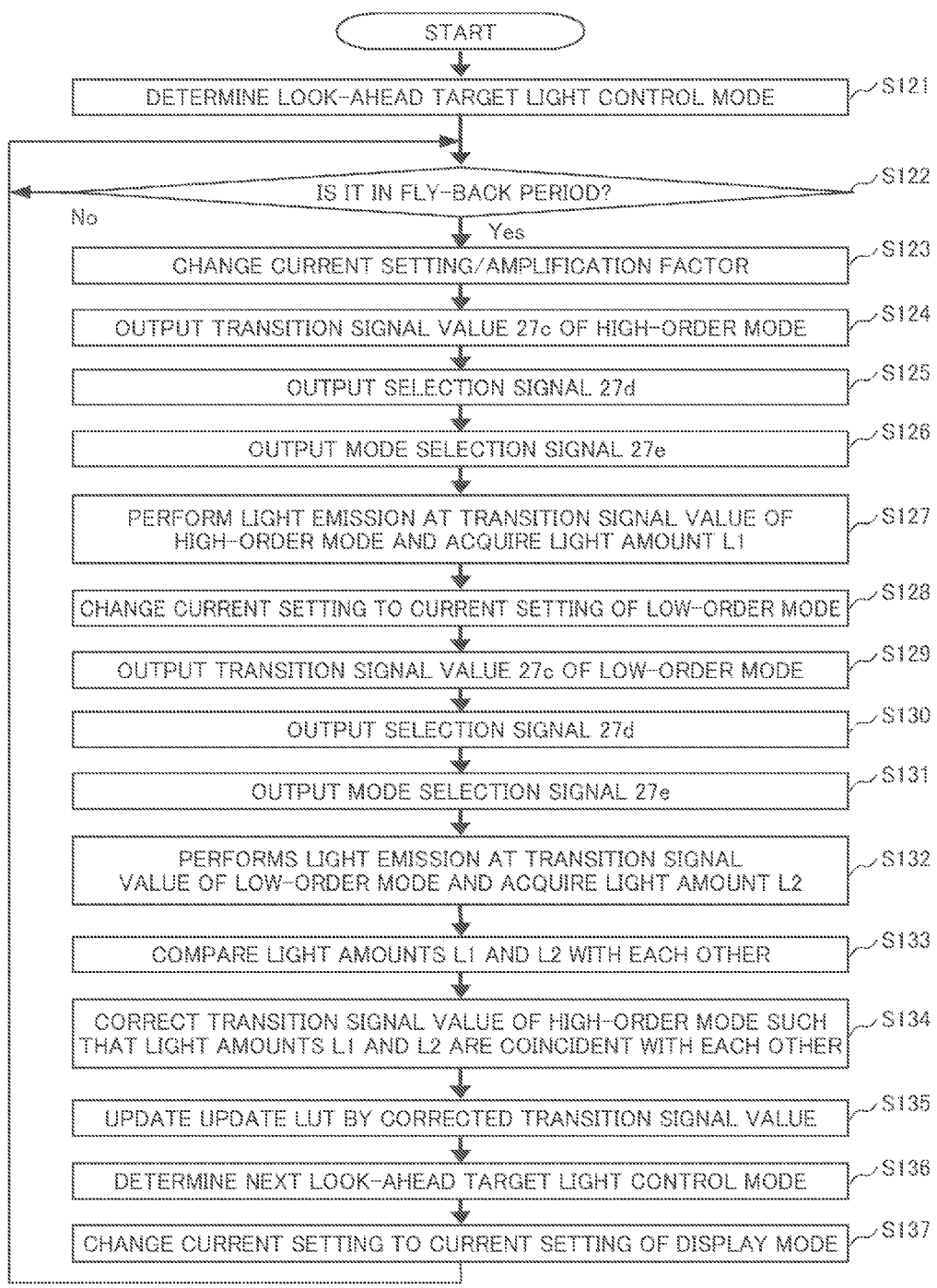
FIG. 12 is a diagram illustrating a flowchart of the transition intensity determination processing.

FIG. 12 is a diagram illustrating a flowchart of the transition intensity determination processing with reference to the timing chart of FIG. 11.

In S121, the light amount detection light control mode determination unit 98 in the light emission control unit 91 determines the look-ahead target light control mode, and transmits the information 27f of the look-ahead target light control mode to the transition intensity determination processing unit 97. Hereinafter, a light control mode which is the look-ahead target light control mode, will be also referred to as a "high-order mode", and here, the light control mode 1 corresponds to the high-order mode. In addition, a light control mode which is darker than the look-ahead target light control mode by one will be also referred to as a "low-order mode", and here, the light control mode 2 corresponds to the low-order mode. In S122, the light emission control unit 91 determines whether or not it is in the fly-back period. In a case where it is not in the fly-back period, the process waits until it is in the fly-back period, and in a case where it is determined that it is in the fly-back period, the process proceeds to S123.

In S123, the current setting with respect to the laser driver 4 and the amplification factor with respect to the amplifier 9 are changed according to the look-ahead target light control mode (the high-order mode). That is, the current setting is changed from the light control mode 3 of the display period to the light control mode 1, which is the high-order mode, by the current setting signal 110 in FIG. 11. In addition, the amplification factor is changed from G3 to G2, which corresponds to the low-order mode, by an amplification factor setting signal (not illustrated). Here, the reason for setting the amplification factor to the amplification factor G2 corresponding to the low-order mode is that a transition signal value of the high-order mode is compared with that of a case where the light control step in the low-order mode is 0 (a case of the brightest low-order mode).

In S124, the transition intensity determination processing unit 97 outputs the transition signal value 27c of the high-order mode to the image correction unit 90. This corresponds to a transition signal value Ts1 of the mode 1 in FIG. 11.

In S125, the selection signal 27d is transmitted to the image correction unit 90, and the selectors 93a to 93c are changed to select the transition signal value 27c. Here, the selection signal 27d corresponds to a selection signal 111 in FIG. 11. The transition signal value 27c output from the selectors 93a to 93c becomes the index of the light control LUTs 94a to 94c. A light control amount at the time of setting the image signal to the transition signal value 27c is output from the light control LUTs 94a to 94c.

In S126, a signal selecting the light control mode 1 as the mode selection signal 27e is transmitted to the image correction unit 90, and a light control amount of the light control LUT 94a corresponding to the high-order mode is output from the mode selector 95.

That is, S123 to S126 are performed, and thus, the image signal 28 after being corrected at the time of setting an input image signal of the high-order mode to the transition signal value 27c is output from the image correction unit 90.

In S127, the light emission control unit 91 transmits the image signal 28 after being corrected to the laser driver 4 as an image signal 31' for adjustment, and thus, the light emission 112 in FIG. 11 is performed. Then, the light amount L1 of the transition signal value 27c of the high-order mode is acquired.

Next, in S128, the current setting is changed to the current setting of the low-order mode (the light control mode 2). That is, the light control mode is changed to the light control mode 2, which is the low-order mode, by a current setting signal 113 in FIG. 11.

In S129, the transition intensity determination processing unit 97 outputs the transition signal value 27c of the low-order mode to the image correction unit 90. This corresponds to a case of the brightest light control step 0 in the low-order mode.

In S130, the selection signal 27d is transmitted to the image correction unit 90, and the selectors 93a to 93c are changed to select the transition signal value 27c. Here, the selection signal 27d corresponds to a selection signal 114 in FIG. 11. The transition signal value 27c output from the selectors 93a to 93c becomes the index of the light control LUTs 94a to 94c. A light control amount at the time of setting the image signal to the transition signal value 27c is output from the light control LUTs 94a to 94c.

In S131, a signal selecting the light control mode 2 is transmitted to the image correction unit 90 as the mode selection signal 27e, and a light control amount of the light control LUT 94b corresponding to the low-order mode is output from the mode selector 95.

That is, S128 to S131 are performed, and thus, the image signal 28 after being corrected at the time of setting an input image signal of the low-order mode to the transition signal value 27c is output from the image correction unit 90.

In S132, the light emission control unit 91 transmits the image signal 28 after being corrected to the laser driver 4 as the image signal 31' for adjustment, and thus, the light emission 115 in FIG. 11 is performed. Then, the light amount L2 of the transition signal value 27c of the low-order mode is acquired.

Next, in S133, the light emission control unit 91 compares the light amounts L1 and L2 which are acquired in S127 and S132, with each other. In S134, the transition signal value of the high-order mode increases and decreases according to a comparison result, and a transition signal value at which both of the light amounts are coincident with each other, is obtained. In an example of FIG. 11, a light amount of the light emission 115 of the low-order mode is greater than a light amount of the light emission 112 of the high-order mode, and thus, the transition signal value of the high-order mode increases from Ts1 to Ts2.

In S135, the transition intensity determination processing unit 97 outputs the corrected transition signal value Ts2 of the high-order mode to the image correction unit 90 as the update signal 27b, and an update LUT of the corresponding light control mode is updated. In this example, the update LUT 92a of the light control mode 1 is updated.

Next, in S136, the light amount detection light control mode determination unit 98 determines the look-ahead target light control mode in the next fly-back period. In S137, the light emission control unit 91 changes the current setting to the current setting of a display mode. That is, the current setting is changed from the light control mode 2, which is the low-order mode, to the light control mode 3, which is the display mode, by a current setting signal 116 in FIG. 11.

Hereinafter, the process returns to S122, and the processing described above is repeated. Thus, the light control value of the update LUT is updated by a new transition signal value 27c, and adjustment can be performed such that the luminances are coincident with each other, between the darkest light control step in the high-order mode and the brightest light control step in the low-order mode.

The transition intensity determination processing described above is performed with respect to all colors, and thus, the chromaticity change is suppressed between the darkest light control step in the high-order mode and the brightest light control step in the low-order mode, and the brightness change and the color change are rarely viewed by the user at the time of performing the light control processing.

In the above description, an example has been described in which the output value is changed to the transition signal value 27c with respect to the index the update LUT corresponding to the darkest light control step 99 in the high-order mode update LUT. Further, it is obvious that the output value of the update LUT is changed with respect to the index of the update LUT corresponding to the other light control step by linear interpolation using the transition signal value 27c.

Furthermore, in the above description, it has been described that one type of light emission is performed at the time of acquiring the light amounts of the transition signal values of the high-order and the low-order mode, and the light emission may be performed a plurality of times with the predetermined current difference Is, as with Example 1. Thus, the luminances and the chromaticities between the light control modes can be coincident with each other with a higher accuracy.

According to Example 3, the value of the LUT is updated such that the light amounts of the laser light on the boundary between the different light control modes are identical to each other, and thus, the luminances between the light control modes can be coincident with each other. The same transition intensity determination processing is performed with respect to all colors, and thus, it is possible to provide a laser projection display device in which the chromaticity change at the time of performing the light control processing is suppressed, and the color change is rarely viewed by the user.

Example 4

In Examples 1 and 2, a configuration has been described, in which the current setting corresponding to the standard image signal of the single light control mode is optimized. In addition, in Example 3, a configuration has been described in which in a case of including a plurality of light control modes, the light control amount is optimized such that the luminance change or the chromaticity change at the time of performing transition between different light control modes is suppressed.

In contrast, in Example 4, a configuration will be described in which current setting of a light control mode of a transition destination is optimized in advance at the time of performing the transition between the different light control modes. For this reason, the light control mode (the look-ahead target light control mode) having a possibility of next transition is switched by the light amount detection light control mode determination unit 98 of the light emission control unit 91 illustrated in FIG. 10, and the current setting corresponding to the standard image signal is optimized in advance with respect to each of the light control modes. At this time, the light amount detection light control mode determination unit 98 selects which light control mode is set to be the look-ahead target according to present light control mode (referred to as a remaining light control mode) and a change situation of the brightness. That is, the proportion of the look-ahead target light control mode is changed according to a transition direction and/or a change rate of the light control mode and the light control step. Hereinafter, the same reference numerals are applied to components having the same configuration and the same function as those of Examples 1 to 3, and the detailed description will be omitted.

FIGS. 13(a)-13(b) are diagrams illustrating an example of a look-ahead target light control mode according to Example 4, and determines a look-ahead target according to the brightness change. Here, five light control modes are provided, a light control mode 1 is the brightest, and a light control mode 5 is the darkest. Currently, an examples of the look-ahead target light control mode of each frame, which remains in a light control mode 3, will be described by being divided into a case where the next brightness to be expected is in a brightness stagnant state (the brightness is not changed), a case where the brightness increases, and a case where the brightness decreases. FIG. 13(a) illustrates light control modes to be looked ahead in the order of the frames, and FIG. 13 (b) illustrates the proportion (the frequency) of the light control mode, which becomes the look-ahead target, until the number of frames becomes 15.

In a case of the brightness stagnant state, a proportion of setting the remaining light control mode 3 and light control modes 2 and 4 of the adjacent brightnesses to the look-ahead target increases. In a case of increasing the brightness, the proportion of the light control mode 2 brighter than the remaining light control mode 3 increases, and in a case of decreasing the brightness, the proportion of the light control mode 4 darker than the remaining light control mode 3 increases. In addition, the proportion (the frequency) may be changed according to a change rate of the brightness. Furthermore, look-ahead is performed over a plurality of frames since the current setting is repeated over the plurality of frames. Thus, by looking ahead a light control mode having a high possibility of transition with a high proportion, it is possible to more efficiently suppress the luminance change and the chromaticity change at the time of performing the light control processing.

Figure 14:
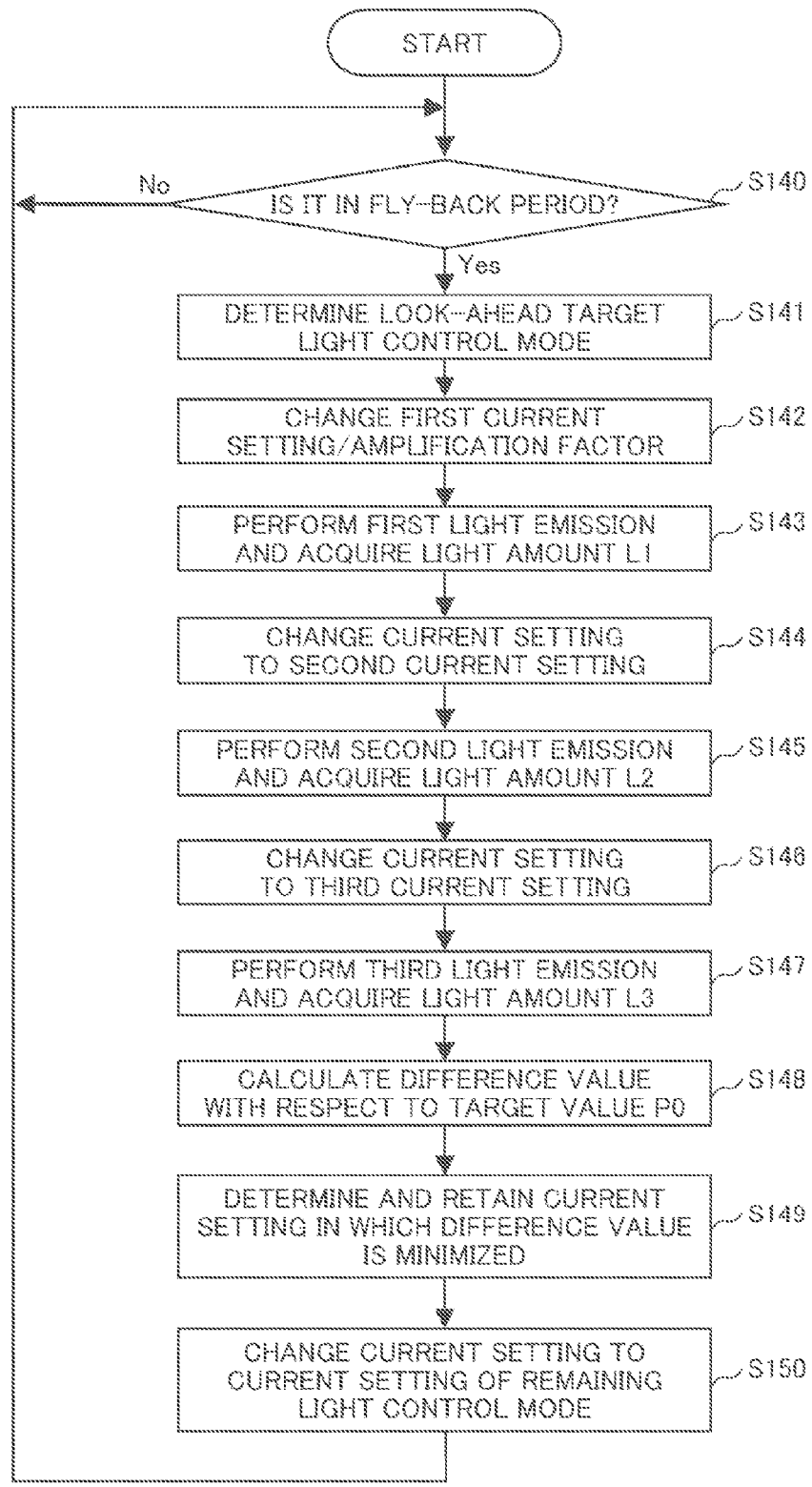
FIG. 14 is a diagram illustrating a flowchart of current setting processing with respect to the look-ahead target light control mode.

FIG. 14 is a diagram illustrating a flowchart of the current setting processing with respect to the look-ahead target light control mode. As with Example 1, an examples will be described in which the light emission is performed three times in order for current adjustment, in the fly-back period of one frame.

In S140, the light emission control unit 91 determines whether or not it is in the fly-back period. In a case where it is not in the fly-back period, the process waits until it is in the fly-back period, and in a case where it is determined that it is in the fly-back period, the process proceeds to S141. In S141, the light amount detection light control mode determination unit 98 determines the look-ahead target light control mode. Here, as illustrated in FIG. 13, for example, the look-ahead target light control mode is selected according to the brightness change.

In S142, the current setting signals 29 and 30 are transmitted to the laser driver 4 on the basis of the determined look-ahead target light control mode, first current setting is performed, and the amplification factor with respect to the amplifier 9 is changed. In S143, the first light emission corresponding to the standard image signal S0 of the look-ahead target light control mode is performed, and thus, the first light amount L1 is acquired.

In S144, the first current setting is changed to second current setting with the predetermined current difference Is. In S145, second light emission corresponding to the standard image signal S0 of the look-ahead target light control mode is performed, and thus, the second light amount L2 is acquired.

In S146, the second current setting is changed to third current setting with the predetermined current difference Is. In S147, third light emission corresponding to the standard image signal S0 of the look-ahead target light control mode is performed, and thus, a third light amount L3 is acquired.

In S148, the obtained three light amounts L1, L2, and L3 are compared with the target value P0 of the look-ahead target light control mode, and each difference value is calculated. In S149, current setting is obtained in which the difference value is minimized, is determined as the current setting of the look-ahead target light control mode, and is retained. Here, a retained current setting value is applied at the time of performing transition to the look-ahead target light control mode. In S150, the current setting is changed to current setting corresponding to the remaining light control mode, the process returns to S140, and a set of current setting processings are repeated.

According to Example 4, the proportion of the look-ahead target light control mode is changed according to the transition direction and/or the change rate of the remaining light control mode and the brightness, and thus, it is possible to select a light control mode having a higher possibility of transition. In addition, in the selected look-ahead target light control mode, the current setting is changed in the fly-back period of one frame, and the light emission is performed a plurality of times, and thus, it is possible to obtain optimal current setting of each the light control modes in advance. Accordingly, it is possible to realize light amount control which is stabilized in the light control processing, and the processing is performed with respect to all colors, and thus, it is possible to provide a laser projection display device in which the chromaticity change is suppressed, and the color change is rarely viewed by the user.

What is claimed is:

1. A laser projection display device which projects laser light of a plurality of colors according to an image signal and displays an image according to the image signal, the device comprising:
    a laser light source generating the laser light of a plurality of colors;
    a scanning unit scanning the laser light generated by the laser light source according to a synchronization signal of the image signal and projecting an image;
    a laser light source driving unit setting a current which drives the laser light source according to the image signal;
    a light sensor detecting a light amount of the laser light generated by the laser light source; and
    a light emission control unit emitting light by supplying a standard image signal and a current setting signal to the laser light source driving unit and setting the laser light source driving unit such that the light amount which is detected by the light sensor becomes a target value,
    wherein the light emission control unit supplies the current setting signal to the laser light source driving unit such that light emission is performed a plurality of times with a predetermined current difference, in a fly-back period in which the image signal in one frame of the image signal is not projected,
    wherein the light emission control unit performs the light emission a plurality of times, compares a plurality of light amounts detected by the light sensor with the target value, determines a current setting in which a difference value with respect to the target value is minimized, and sets the laser light source driving unit by applying the determined current setting to an image display of a next frame, and
    wherein the laser light source driving unit includes an offset current setting unit that determines an offset current which flows into the laser light source, and a current gain setting unit that determines a current which is proportional to the image signal, and wherein the predetermined current difference is a current difference of less than or equal to two times any minimum current difference which is capable of being set by the offset current setting unit or the current gain setting unit.

2. The laser projection display device according to claim 1,
    wherein the light emission control unit supplies the standard image signal instead of the current setting signal by changing the standard image signal by a signal corresponding to the predetermined current difference, in order to perform the light emission a plurality of times.

3. The laser projection display device according to claim 1,
    wherein the light emission control unit sets a plurality of standard image signals having different signal levels as the standard image signal, and a plurality of target values of light amounts corresponding to the plurality of standard image signals, and
    the light emission control unit performs the light emission a plurality of times, compares light amounts of the plurality of standard image signals detected by the light sensor with the plurality of target values to which the light amounts of the plurality of standard image signals correspond, determines current setting in which a sum of difference values with respect to each of the target values is minimized, and sets the laser light source driving unit by applying the determined current setting to an image display of a next frame.

4. A laser projection display device which projects laser light of a plurality of colors according to an image signal and displays an image according to the image signal, the device comprising:
    a laser light source generating the laser light of a plurality of colors;
    a scanning unit scanning the laser light generated by the laser light source according to a synchronization signal of the image signal and projecting an image;

a laser light source driving unit setting a current which drives the laser light source according to the image signal;

a light sensor detecting a light amount of the laser light generated by the laser light source;

a light control setting input unit dividing and allocating a brightness of an image to be displayed into a plurality of light control modes and a light control step which partitions the light control mode into a plurality of brightnesses, according to information determining the brightness of the image to be displayed;

a first light control processing unit including a plurality of light control look-up tables which store a light control amount by using a gray level of the image signal as an index, in each of the divided light control modes;

a second light control processing unit including a plurality of update look-up tables which are capable of obtaining an index of the light control look-up table by using the gray level of the image signal as an index, and are capable of being updated, in each of the divided light control modes;

a third light control processing unit including a gain look-up table which retains a gain corresponding to the light control step, and a multiplier which is capable of obtaining an index of the update look-up table by multiplying the image signal and the gain together; and a light emission control unit emitting light by supplying a current setting signal and an image signal of the light control amount stored in the light control look-up table of the first light control processing unit to the laser light source driving unit and updating a value of the update look-up table by comparing the light amounts detected by the light sensor, wherein the light emission control unit supplies the current setting signal and the image signal to the laser light source driving unit such that light emission is performed in different light control modes by using a light control value of the light control step on a boundary between the different light control modes which are adjacent to each other, and updates the value of the update look-up table such that the light amounts of the laser light detected by the light sensor in the different light control modes are coincident with each other.

5. A laser projection display device which projects laser light of a plurality of colors according to an image signal and displays an image according to the image signal, the device comprising:

a laser light source generating the laser light of a plurality of colors;

a scanning unit scanning the laser light generated by the laser light source according to a synchronization signal of the image signal and projecting an image;

a laser light source driving unit setting a current which drives the laser light source according to the image signal;

a light sensor detecting a light amount of the laser light generated by the laser light source;

a light emission control unit emitting light by supplying a standard image signal and a current setting signal to the laser light source driving unit and setting the laser light source driving unit such that the light amount which is detected by the light sensor becomes a target value, in a fly-back period in which the image signal is not projected;

a light control setting input unit dividing and allocating a brightness of an image to be displayed into a plurality of light control modes and a light control step partitioning the light control mode into a plurality of brightnesses, according to information determining the brightness of the image to be displayed; and a light amount detection light control mode determination unit determining in advance which light control mode of the plurality of light control modes is used as a target to perform the light emission and light amount detection, in the light emission control unit, wherein the light amount detection light control mode determination unit sequentially changes a light control mode which becomes a target of the light emission and the light amount detection over a plurality of frames of the image signal, and the light emission control unit sequentially supplies a standard image signal and a current setting signal corresponding to the light control mode which is changed by the light amount detection light control mode determination unit, to the laser light source driving unit.

6. The laser projection display device according to claim 5, wherein the light amount detection light control mode determination unit changes a proportion of the light control mode which becomes the target of the light emission and the light amount detection over the plurality of frames of the image signal, according to a transition direction and/or a change rate of the light control mode and the light control step which are allocated by the light control setting input unit.

* * * * *